United States Patent
Hublet

(10) Patent No.: US 9,432,835 B2
(45) Date of Patent: Aug. 30, 2016

(54) METHOD AND SYSTEM FOR ROUTING DATA TO A MOBILE NODE IN A FOREIGN NETWORK

(75) Inventor: Christian Hublet, Lochristi (BE)

(73) Assignee: Alcatel Lucent, Boulogne-Billancourt (FR)

( * ) Notice: Subject to any disclaimer, the term of this patent is extended or adjusted under 35 U.S.C. 154(b) by 550 days.

(21) Appl. No.: 13/516,038

(22) PCT Filed: Dec. 13, 2010

(86) PCT No.: PCT/EP2010/069499
§ 371 (c)(1),
(2), (4) Date: Jun. 14, 2012

(87) PCT Pub. No.: WO2011/073135
PCT Pub. Date: Jun. 23, 2011

(65) Prior Publication Data
US 2012/0300721 A1 Nov. 29, 2012

(30) Foreign Application Priority Data
Dec. 15, 2009 (EP) .................................... 09306235

(51) Int. Cl.
*H04W 8/08* (2009.01)
*H04W 40/24* (2009.01)

(52) U.S. Cl.
CPC ............. *H04W 8/082* (2013.01); *H04W 40/24* (2013.01)

(58) Field of Classification Search
CPC ....... H04W 8/02; H04W 8/08; H04W 8/082; H04W 40/24
USPC .................. 370/328, 329, 331, 338; 455/424
See application file for complete search history.

(56) References Cited

U.S. PATENT DOCUMENTS 6,614,774 B1  9/2003  Wang
6,629,149 B1  9/2003  Fraser et al.
(Continued)

FOREIGN PATENT DOCUMENTS

CN  1259837 A   7/2000
EP  1379034 A1  1/2004
(Continued)

OTHER PUBLICATIONS

International Search Report for PCT/EP2010/069499 dated Mar. 24, 2011.
(Continued)

*Primary Examiner* — Pao Sinkantarakorn
*Assistant Examiner* — Richard Chang
(74) *Attorney, Agent, or Firm* — Fay Sharpe, LLP

(57) ABSTRACT

A method for delivering at least one data packet is disclosed originating from a corresponding node in a corresponding network to a mobile node having a home network and being connected to a foreign network different from said home network, the mobile node having a long term IP address belonging to said home network and a care-of-address being the address of an foreign network access router of said foreign network, said networks being connected to an IP network comprising at least one data storage, by respectively a home network access router, a corresponding network access router, and said foreign network access router, the method comprising: a. intercepting said at least one data packet and detecting the destination IP address thereof; b. consulting said at least one data storage, whereby said care-of-address of said mobile node is retrieved by using the destination IP address of said at least one packet; c. forwarding said at least one data packet directly to said care-of-address, and indicating said long term IP address to said foreign network access router.

8 Claims, 3 Drawing Sheets

(56) References Cited

U.S. PATENT DOCUMENTS

| | | |
|---|---|---|
| 7,313,631 B1 | 12/2007 | Sesmun et al. |
| 2002/0059452 A1 | 5/2002 | Yokota et al. |
| 2003/0035387 A1 | 2/2003 | Kim |
| 2004/0024901 A1 | 2/2004 | Agrawal et al. |
| 2005/0055576 A1* | 3/2005 | Mononen et al. ............ 713/201 |
| 2006/0018291 A1 | 1/2006 | Patel et al. |
| 2008/0198805 A1 | 8/2008 | Weniger et al. |

FOREIGN PATENT DOCUMENTS

| | | |
|---|---|---|
| EP | 2 099 189 A1 | 9/2009 |
| JP | 2002-094557 | 3/2002 |
| JP | 2002-223237 | 8/2002 |
| JP | 2002223236 | 8/2002 |
| JP | 2002271368 | 9/2002 |
| JP | 2002271368 A | 9/2002 |

OTHER PUBLICATIONS

JP Patent Application No. 2012-543652, JP Office Action drafted Aug. 15, 2013 (dispatch date: Aug. 20, 2013), English translation provided).

China Patent Application No. 201080056995.3, China Patent Office Action mailed Mar. 26, 2014, (English translation provided), 14 pgs.

European Supplemental Search Report, EP09306235.4, Dated Aug. 28, 2012, 7 pgs.

Japan Patent Application 2012-543652, Japan Patent Office Action drafted Mar. 11, 2014, mailed Mar. 18, 2014, 6 pgs.

Korean Patent Application No. 10-2012-7018119, Korean Patent Office Action mailed Jun. 26, 2014, Attorney Hoon Chang (English translation provided), 14 pgs.

Chinese Patent Application No. 201080056995.3, Chinese Patent Office Action mailed Dec. 4, 2014, Attorney Zhongzi Law Office (English translation provided), 8 pgs.

"Mobile IP Technique" (English translation of title of article), *Mobile Communications* (*Aug. 2005*) (English translation of journal); English translation of the Epilogue is provided. Also provided is the English translation of the sentence in the Office Action, including English terms corresponding to Chinese characters in Figure 2; Aug. 2005; 4 pgs.

Japanese Patent Application No. 2012-543652, English translation of Japanese Office Action drafted Feb. 13, 2015, mailed Feb. 17, 2015, (English translation provided), 8 pgs.

EP Communication Pursuant to Article 94(3) EPC; EP Appl. No. 09306235.4-1854; Dated Oct. 20, 2010; 6 pgs.

* cited by examiner

METHOD AND SYSTEM FOR ROUTING DATA TO A MOBILE NODE IN A FOREIGN NETWORK

TECHNICAL FIELD OF THE INVENTION

The present invention relates to network routing, and more particularly to a system and method for managing connectivity for a mobile node entering a foreign network different from the mobile node's home network.

BACKGROUND

The mobile Internet Protocol (IP) enables a mobile node to move freely from one point of connection to another in different networks which are visited along its route. More specifically, the mobile IP protocol describes those actions that enable a mobile node to maintain connectivity during a handover from one access router to another access router.

Mobile IP is described in specifications that may be found from the Internet Engineering Task Force (IETF), and the like, as for instance in RFC (Request For Comments) 3344 and RFC 3776. Mobile IP enables the mobile node to be identified by its home address, regardless of its current point of attachment to the Internet. When the mobile node is away from the home network, it is also associated with a care-of-address, which provides information about the mobile node's current location. Typically, during a handover between access routers the care-of-address changes but the home address remains the same.

The following provides a rough outline of operation of the state of the art mobile IP protocol:

Mobility agents (i.e., foreign agents and home agents) advertise their presence via Agent Advertisement messages. A mobile node may optionally solicit an Agent Advertisement message from any locally attached mobility agents through an Agent Solicitation message.

A mobile node receives these Agent Advertisements and determines whether it is on its home network or a foreign network.

When the mobile node detects that it is located on its home network, it operates without mobility services. If returning to its home network from being registered elsewhere, the mobile node deregisters with its home agent, through exchange of a Registration Request and Registration Reply message with it.

When a mobile node detects that it has moved to a foreign network, it obtains a care-of address on the foreign network.

The mobile node operating away from home then registers its new care-of address with its home agent through exchange of a Registration Request and Registration Reply message with it, possibly via a foreign agent.

Datagrams sent to the mobile node's home address are intercepted by its home agent, tunneled by the home agent to the mobile node's care-of address, received at the tunnel endpoint, and finally delivered to the mobile node.

In the reverse direction, datagrams sent by the mobile node are generally delivered to their destination using standard IP routing mechanisms, not necessarily passing through the home agent.

When away from home, Mobile IP uses protocol tunneling to hide a mobile node's home address from intervening routers between its home network and its current location. The tunnel terminates at the mobile node's care-of address. The care-of address must be an address to which datagrams can be delivered via conventional IP routing. At the care-of address, the original datagram is removed from the tunnel and delivered to the mobile node.

The problem with this state of the art approach, is that the so called triangular routing is not data transport efficient, as all traffic to a mobile node in a foreign network is routed via the home agent in the home network of the mobile node. The use of the long term IP address belonging to the home network of the mobile node has made such a scheme necessary.

SUMMARY

Throughout the specification and claims, the following terms take the meanings explicitly associated herein, unless the context clearly dictates otherwise.

The term "router" refers to a dedicated network element that receives packets and forwards them towards a destination. In particular, a router is used to extend or segment networks by forwarding packets from one subnet to another. A router typically operates at layer 3 TCP/IP of the Open Systems Interconnection (OSI) reference model for networking. However, some routers can provide additional functionality that operates above layer 3 of TCP/IP or OSI reference model.

The term "access router" refers to a router that is associated with a mobile node for providing IP connectivity between the mobile node and other nodes on an IP network, such as a correspondent node. Although the access router is a dedicated network element coupled to an IP network, it may also be in communication with one or more points of attachment for a wireless network.

The term "Mobile Node" refers to a (e.g. wireless) device that changes its point of attachment from one network or sub-network to another. A mobile node may change its location without losing connectivity and without changing its IP address; it may continue to communicate with other Internet nodes at any location using its (constant or long-term) IP address, assuming link-layer connectivity to a point of attachment is available. A mobile node is given a long-term home IP address on a home network. This home address is administered in substantially the same way as a "permanent" IP address is provided to a stationary host. A mobile node can change its point of attachment from one link to another, while still being reachable via its home address.

The term "link-layer," also referred to as data-link layer, or network interface layer, refers to a device driver within an operating system, and a corresponding network interface card, that are configured to enable physical interfacing to a network media, such as a cable, wireless media, or the like. The link-layer typically operates at layer 2 of the Open Systems Interconnection (OSI) reference model for networking.

The term "IP connectivity" refers to the ability to send and receive normal IP packets.

The term "flow" refers to a flow of packets.

The term "Care-of Address" refers to the termination point of a tunnel towards a mobile node, for datagrams forwarded to the mobile node while it is away from home.

The term "Correspondent Node" refers to a peer with which a mobile node is communicating. A correspondent node may be either mobile or stationary.

The term "Foreign Network" refers to any network other than the mobile node's Home Network.

The term "Home Address" refers to an IP address that is assigned for an extended period of time to a mobile node. It remains unchanged regardless of where the node is attached to the Internet.

The term "Home Network" refers to a network, possibly virtual, having a network prefix matching that of a mobile node's home address. Note that standard IP routing mechanisms will deliver datagrams destined to a mobile node's Home Address to the mobile node's Home Network.

The term "Link" refers to a facility or medium over which nodes can communicate at the link layer. A link underlies the network layer.

The term "Link-Layer Address" refers to the address used to identify an endpoint of some communication over a physical link. Typically, the Link-Layer address is an interface's Media Access Control (MAC) address.

The term "Mobility Agent" refers to Either a home agent or a foreign agent.

The term "Node" refers to a host or a router.

The term "Tunnel" refers to the path followed by a datagram while it is encapsulated. The model is that, while it is encapsulated, a datagram is routed to a knowledgeable decapsulating agent, which decapsulates the datagram and then correctly delivers it to its ultimate destination.

The term "Visited Network" refers to a network other than a mobile node's Home Network, to which the mobile node is currently connected.

The term "Agent Discovery" refers to Home agents and foreign agents advertising their availability on each link for which they provide service. A newly arrived mobile node can send a solicitation on the link to learn if any prospective agents are present.

The term "Registration" refers to when the mobile node is away from home, it registers its care-of address with its home agent. Depending on its method of attachment, the mobile node will register either directly with its home agent, or through a foreign agent which forwards the registration to the home agent.

It is an object of the present invention to provide a method and systems which remove the need for triangular routing in mobile IP.

According to a first aspect of the present invention a method is disclosed for delivering at least one data packet originating from a corresponding node in a corresponding network to a mobile node having a home network and being connected to a foreign network different from the home network, the mobile node having a long term IP address belonging to the home network and a care-of-address being the address of an foreign network access router of the foreign network, the home network, the corresponding network and the foreign network being coupled to each other by means of an IP network comprising at least one data storage, the networks being connected to the IP network by respectively a home network access router, a corresponding network access router, and the foreign network access router, the method comprising performing by the corresponding network access router:

a. intercepting the at least one data packet and detecting the destination IP address thereof;
b. consulting the at least one data storage, whereby the care-of-address of the mobile node is retrieved by using the destination IP address of the at least one packet;
c. forwarding the at least one data packet directly to the care-of-address, and further indicating the long term IP address of the mobile node to the foreign network access router, such that the foreign network access router can forward the at least one data packet to the mobile node.

According to embodiments of the present invention the method is performed on a per data packet basis.

According to embodiments of the present invention the method further comprises receiving notifications of changes in the care-of-address of the mobile node, such that consulting the data storage is not necessary on a per packet basis.

According to embodiments of the present invention the data storage comprises a DNS server.

According to embodiments of the present invention forwarding the at least one data packet by the corresponding network access router directly to the care-of-address is based on Layer 3 connectivity of the ISO reference model.

According to embodiments of the present invention the method comprises tunneling the at least one data packet between the corresponding network access router and the foreign network access router.

According to embodiments of the present invention the long term IP address is a public address.

According to a second aspect of the present invention a method is disclosed for updating internet location information for a mobile node on a storage by an access router of a network, the storage being accessible through the internet, comprising sending a care-of-address of the mobile node and a long term IP address of the mobile node to the storage over the IP network.

According to embodiments of the present invention the access router is a home network access router of the mobile node.

According to embodiments of the present invention the access router is a foreign network access router of the mobile node.

According to a third aspect of the present invention an access router for an IP network is disclosed, arranged for forwarding long term IP address and care-of-address of a mobile node belonging to its domain to a DNS server in the IP network to which it provides access.

According to a fourth aspect of the present invention an access router for an IP network is disclosed, which is arranged for intercepting data packets originating from nodes within its domain and directed towards nodes outside its domain, extracting destination addresses of the packets, and retrieving care-of-addresses corresponding to the destination addresses of the packets from a storage in the IP network.

Further aspects of the present invention are described by the dependent claims. The features from the dependent claims, features of any of the independent claims and any features of other dependent claims may be combined as considered appropriate to the person of ordinary skill, and not only in the particular combinations as defined by the claims.

DESCRIPTION OF THE FIGURES

The accompanying drawings are used to illustrate embodiments of the present invention.

Reference signs are chosen such that they are the same for similar or equal elements or features in different figures or drawings.

DETAILED DESCRIPTION

The above and other advantageous features and objects of the invention will become more apparent and the invention will be better understood from the following detailed description when read in conjunction with the respective drawings.

The description of aspects of the present invention is performed by means of particular embodiments and with reference to certain drawings but the invention is not limited thereto. Depicted figures are only schematic and should not be considered as limiting. E.g. certain elements or features may be shown out of proportion or out of scale with respect to other elements.

In the description of certain embodiments according to the present invention, various features are sometimes grouped together in a single embodiment, figure, or description thereof for the purpose of aiding in the understanding of one or more of the various inventive aspects. This is not to be interpreted as if all features of the group are necessarily present to solve a particular problem. Inventive aspects may lie in less than all features of such a group of features present in the description of a particular embodiment.

Figure 1:
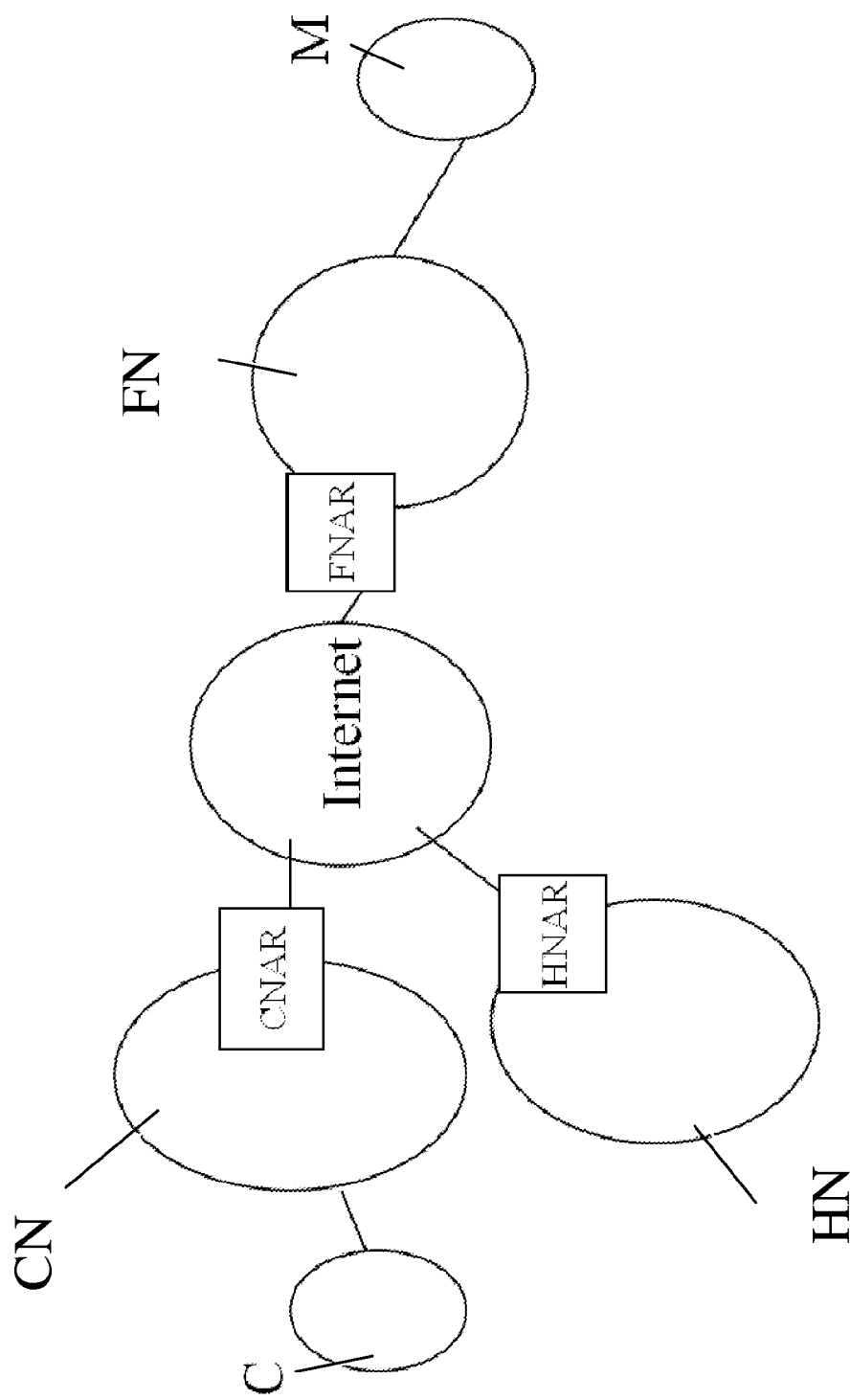
FIG. 1 depicts a scheme of a typical network architecture in which the mobile IP mechanism is applied.

In FIG. 1 a scheme of a typical network architecture in which the mobile IP mechanism is applied, is depicted. Multiple access networks, namely a corresponding network (CN), a home network (HN), and a foreign network (FN), are interconnected by means of the internet network. Terminals are connected by means of access networks. The terminal typically has a layer 2 connectivity up to the layer 3 node, being for instance an edge router in the access network to which the terminal is attached (called domain). Each of the networks is connected by means of a respective access router to the internet; a corresponding network access router (CNAR), a home network access router (HNAR), and a foreign network access router (FNAR).

In a typical situation a corresponding node (C), for instance belonging to the corresponding network domain, forwards a packet to a mobile node (M). This mobile node (M) belongs to the home network (HN) from which it acquired a long-term IP address. When the mobile node is travelling and attaches to foreign networks, delivering of data packets sent from the corresponding node to the mobile node is based on the long-term IP address and a care-of-address of the mobile node. A care-of-address can typically be the IP address access router of the foreign network.

Figure 2:
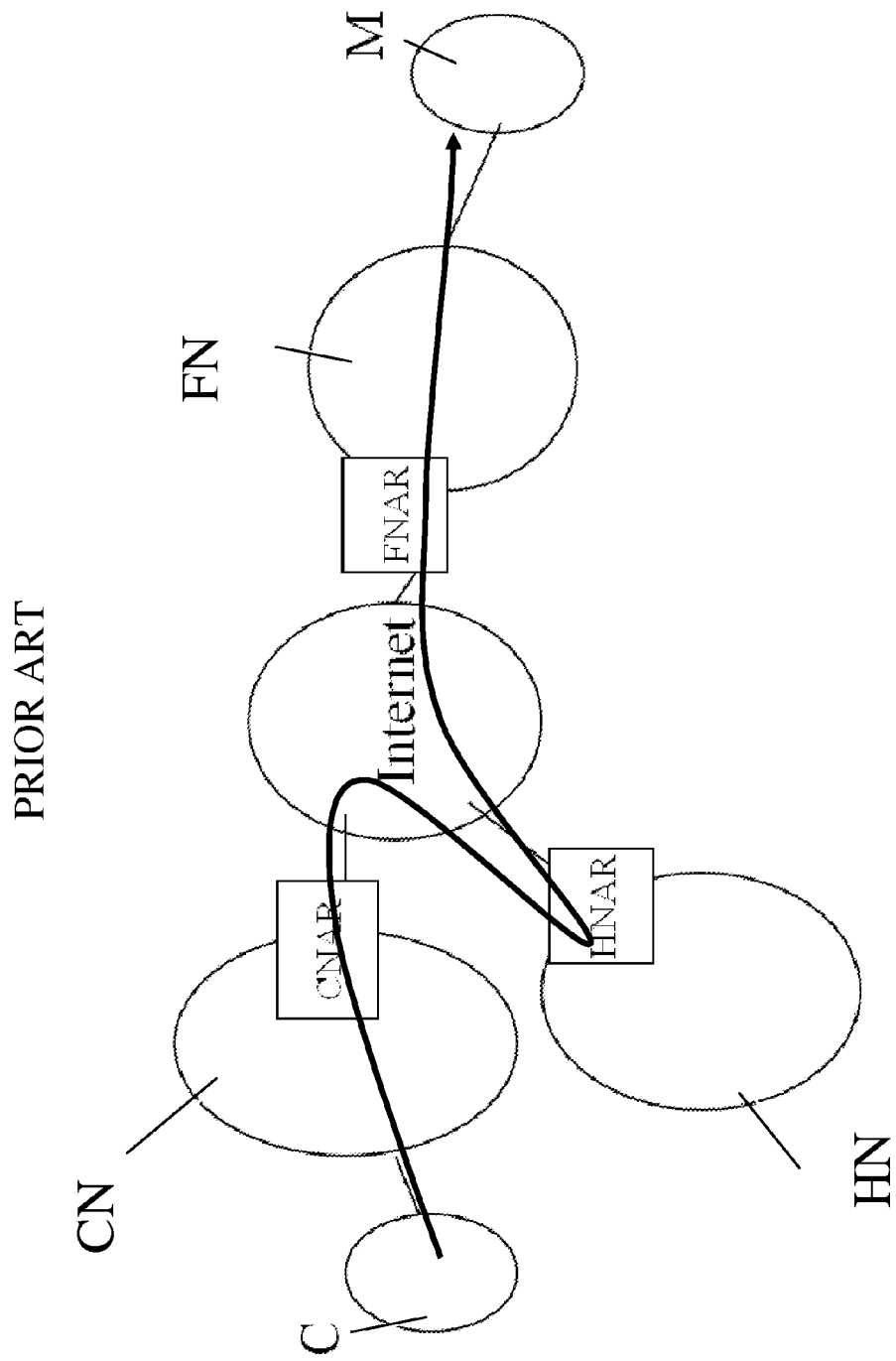
FIG. 2 illustrates the state of the art mobile IP routing mechanisms.

FIG. 2 illustrates the mechanism of "triangular routing", which is a result of the state of the art mobile IP mechanisms. When sending a packet from the corresponding node towards the mobile node, the packet is directed towards the long-term IP address of the mobile node. The home network access router (HNAR) intercepts the packet which is destined for the mobile node, and has been made aware by the mobile node or by the access router of the foreign network (FNAR) of the mobile node's care-of-address, typically being the IP address of the FNAR. The HNAR then forwards the packets to the FNAR, by tunneling it to the care-of-address of the mobile node. In the FNAR, the tunnel is ended, and an association exists between the long-term IP address of the mobile node and the link layer (or layer 2) address of the mobile node, such that the FNAR can forward the information to the mobile node M. This form of packet routing is not data transport efficient, as all traffic to the mobile network in a foreign network is routed via the home agent in the home network of the mobile node.

Figure 3:
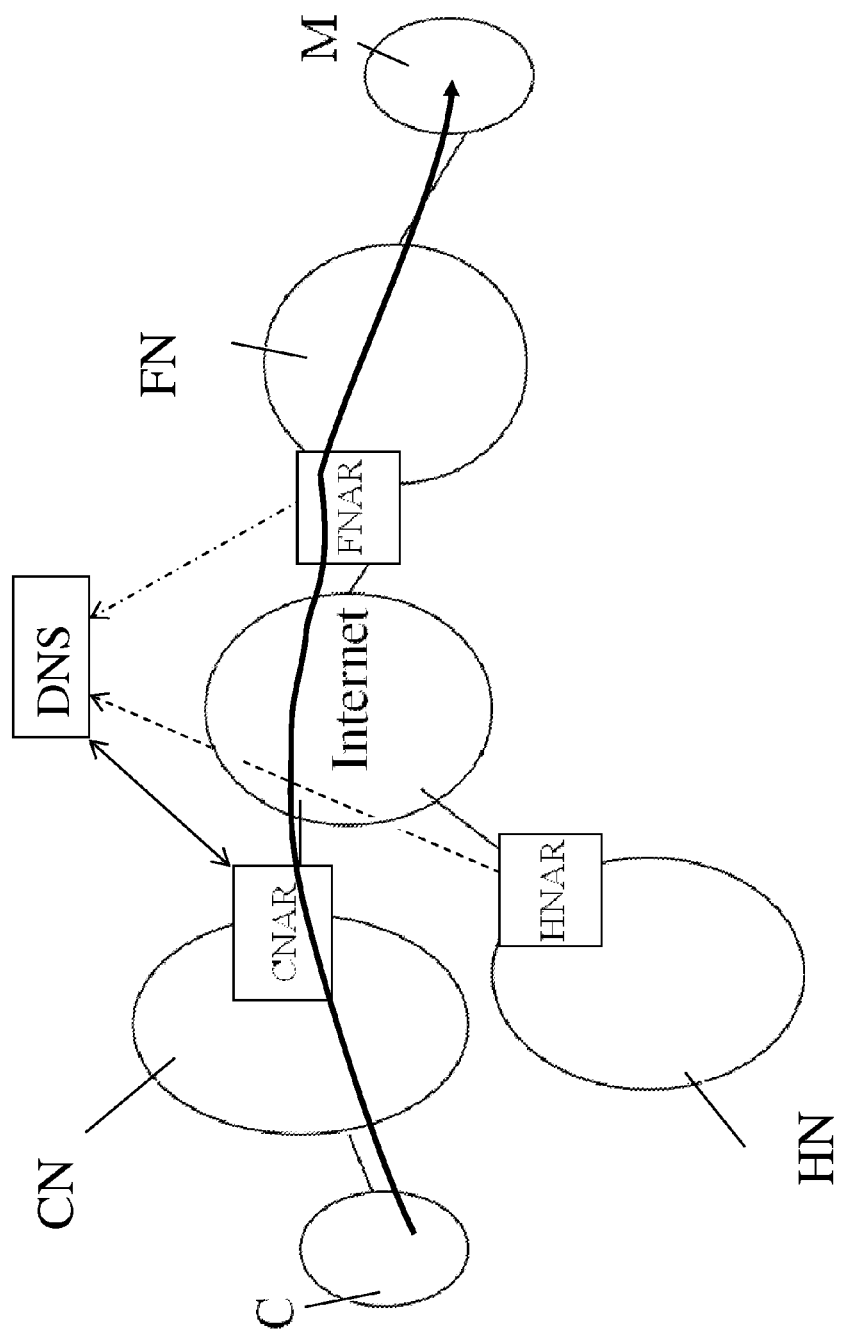
FIG. 3 illustrates an improved mobile IP routing mechanism according to aspects of the present invention.

In FIG. 3 an improved mobile IP routing mechanism is illustrated according to embodiments of the present invention. The required basic architecture is very similar to the state of the art architecture, but comprises further a data storage, for instance a domain name server (DNS). The proposed use of the DNS server avoids the need for triangular routing of packets between a corresponding node and a mobile node, as follows: when the corresponding node sends this packets over the corresponding network and the corresponding network access router (CNAR), towards the mobile node, the CNAR intercepts the package and consults the storage means (for instance DNS server) in order to retrieve location data based on the long-term IP address of the mobile node. In the DNS the long-term IP address of the mobile node is linked with (or bound with) the care-of-address of the mobile node. The care-of-address of the mobile node can be returned to the CNAR, such that the CNAR can forward the packet to the access router of the foreign network, corresponding to the care-of-address of the mobile node by tunneling the packet over the internet. At the FNAR the tunnel is ended, and the destination address of the original IP packet is associated with a link layer address of the mobile node in the foreign network. Then the packet can be forwarded to the mobile node based on link layer connectivity. This procedure allows avoiding the triangular routing and is thus more transport efficient than the state of the art mechanism. It does require the maintenance of a data storage, for instance a DNS, in which the long-term IP address (which is preferably a public IP address) is stored and linked with the current care-of-address of the mobile node.

When a mobile node is travelling along different foreign networks, the registration of the node with each of those foreign networks comprises the acquisition of a care-of-address in each of those network. Once a care-of-address is acquired by state of the art mechanisms, the care-of-address is typically forwarded to the home network access router, directly by the mobile node, or indirectly via the foreign network access router. According to the standardized mobile IP protocol the foreign network access router and the home network access router (or foreign agent and home agent) are aware of the care-of-address of the mobile node at any time. The updating of the DNS can thus preferably be performed by the home network access router (or home agent) as this party is typically a trusted party. If the foreign network access router (or foreign agent) is a trusted party, the maintenance of the binding information between the long-term IP address and the care-of-address of the mobile node in the DNS can be performed by the FNAR (or foreign agent).

It can be noted that the standard notion as described in the mobile IP standards of a foreign agent (FA) and a home agent (HA) remain the same, but their functions are different:

the foreign agent (FA) is aware of the position of the mobile node visiting his domain;

the home agent (HA) is aware of the location of all mobile nodes belonging to his domain; meaning that the home agent is the preferred trusted entity to manage the terminal and update information in the DNS for a terminal in its domain.

The registration process for a mobile node in foreign networks can correspond to the state of the art registration process. The foreign agent and home agent are located on the edge of the layer 2 domain.

For the communication from the corresponding node to the mobile node;

if the mobile node is in his home network, all routing occurs via the home agent of the "mobile" node, and the packet is forwarded without modification. This corresponds to normal mobile IP behavior.

if the mobile node is in the visited (or foreign) network direct routing is possible wherein the packet is tunneled from the access router of the corresponding network to the access router of the foreign network (or foreign agent). This means that the foreign agent can behave according to the mobile IP V4 specification.

Advantages of embodiments of the present invention are that the mechanism fits or is technically compatible with the current IP V4 architecture and that no modifications to the terminals is necessary. An important advantage is that triangular routing can be avoided and that a more efficient data transport can be achieved.

According to embodiments of the present invention a consultation of the DNS may be necessary for each of the packets forwarded from the corresponding node to the mobile node, as the mobile node may change access network and may therefore change care-of-address.

According to preferred embodiments of the present invention the DNS server comprising the binding information between the long-term IP address of the mobile node and the care-of-address of the mobile node may forward (and may be adapted therefor) the new care-of-address automatically to the corresponding network access router whenever a change in care-of-address occurs for the mobile node. Applying such a mechanism in the DNS server allows the removal of the active consultation step of the DNS server by the access router of the corresponding network for every packet. After the consultation for the first packet of a data stream, such a mechanism may further not be necessary anymore.

While some embodiments described herein include some but not other features included in other embodiments, combinations of features of different embodiments are meant to be within the scope of the invention, and form different embodiments, as would be understood by the skilled person.

While the principles of the invention have been set out above in connection with specific embodiments, it is to be clearly understood that this description is merely made by way of example and not as a limitation of the scope of protection which is determined by the appended claims.

The invention claimed is:

1. A method for delivering at least one data packet originating from a corresponding node in a corresponding network to a mobile node having a home network and being connected to a foreign network different from said home network, the mobile node having a long term IP address belonging to said home network and a care-of-address being the address of an foreign network access router of said foreign network, said home network, said corresponding network and said foreign network being coupled to each other by means of an IP network comprising at least one data storage in which storage said long term IP address of the mobile node is linked with the care-of-address of the mobile node, said networks being connected to said IP network by respectively a home network access router, a corresponding network access router, and said foreign network access router, the method comprising performing by said corresponding network access router:

a. intercepting said at least one data packet and detecting a destination IP address thereof;
b. consulting said at least one data storage of the IP network, wherein said care-of-address of said mobile node is retrieved by using the destination IP address of said at least one packet;
c. tunneling said at least one data packet directly to said care-of-address over the internet, and further indicating said long term IP address of said mobile node to said foreign network access router, such that said foreign network access router forwarding said at least one data packet to said mobile node based on link-layer connectivity.

2. A method according to claim 1, performed on a per data packet basis.

3. A method according to claim 1, further comprising receiving notifications of changes in said care-of-address of said mobile node, such that consulting said data storage is not performed on a per data packet basis.

4. A method according to claim 1, wherein said data storage comprises a DNS server.

5. A method according to claim 1, wherein said forwarding said at least one data packet by said corresponding network access router directly to said care-of-address is based on Layer 3 connectivity of the ISO reference model.

6. A method according to claim 5, comprising tunneling said at least one data packet between said corresponding network access router and said foreign network access router.

7. A method according to claim 1, wherein said long term IP address is a public address.

8. An access router for an IP network, comprising at least one processor; and a memory for storing instructions to be executed by the processor for:

delivering at least one data packet originating from a corresponding node in a corresponding network to a mobile node having a home network and being connected to a foreign network different from said home network, the mobile node having a long term IP address belonging to said home network and a care-of-address being the address of an foreign network access router of said foreign network, said home network, said corresponding network and said foreign network being coupled to each other by means of the IP network comprising at least one data storage in which storage said long term IP address of the mobile node is linked with the care-of-address of the mobile node, said networks being connected to said IP network by respectively a home network access router, a corresponding network access router, and said foreign network access router, said at least one processor further arranged for:

intercepting said at least one data packet and detecting a destination IP address thereof, consulting said at least one data storage of the IP network, wherein said care-of-address of said mobile node is retrieved by using the destination IP address of said at least one packet, and tunneling said at least one data packet directly to said care-of-address over the internet, and further indicating said long term IP address of said mobile node to said foreign network access router, such that said foreign network access router forwarding said at least one data packet to said mobile node based on link-layer connectivity.

* * * * *